UNITED STATES PATENT OFFICE.

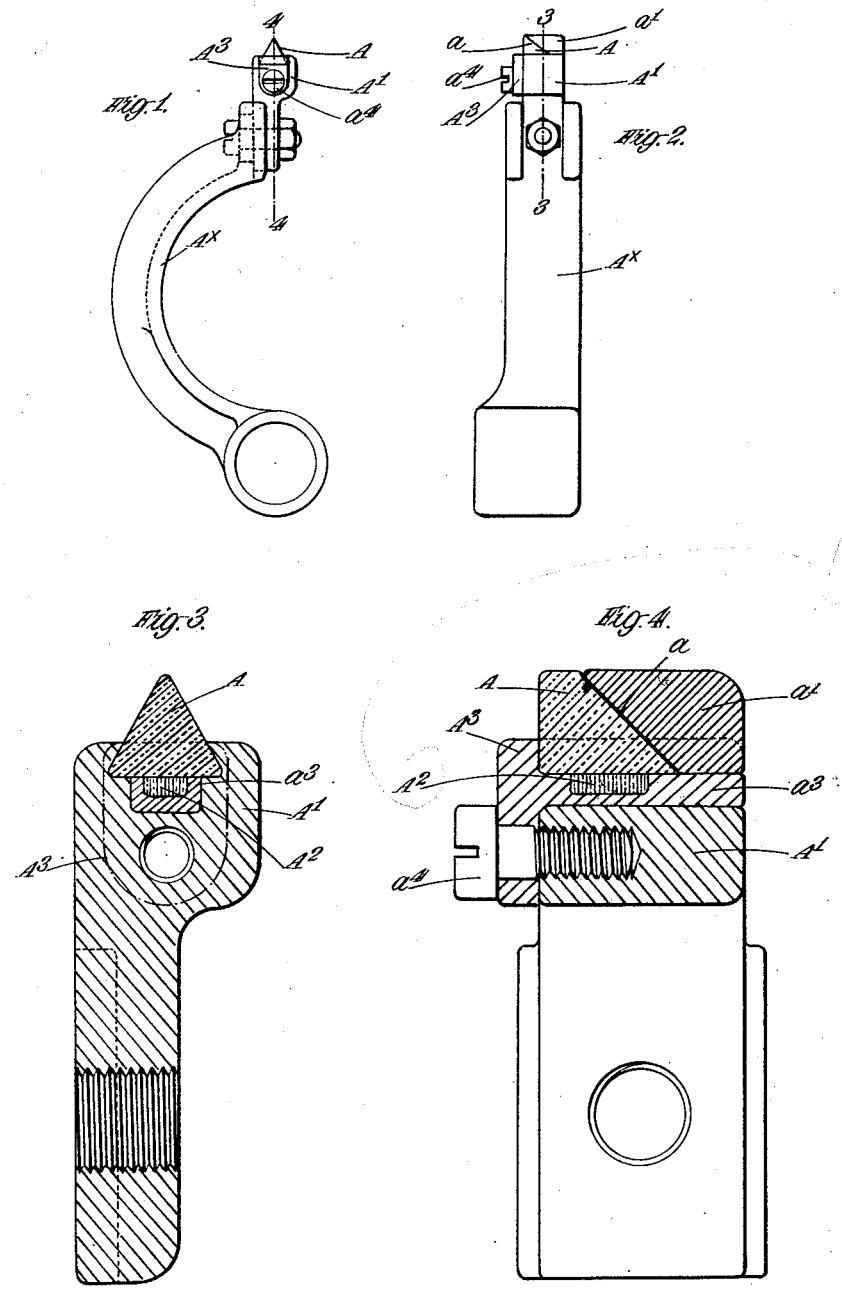

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

SIGHTING DEVICE FOR GUNS.

1,346,303.   Specification of Letters Patent.   Patented July 13, 1920.

Application filed February 7, 1918. Serial No. 215,944.

*To all whom it may concern:*

Be it known that we, Sir ARTHUR TREVOR DAWSON, knight, and Sir GEORGE THOMAS BUCKHAM, knight, both subjects of the King of Great Britain, residing at Vickers House, Broadway, Westminster, in the county of London, England, have invented certain new and useful Improvements in or Relating to Sighting Devices for Guns, of which the following is a specification.

This invention relates to gun sighting devices of the kind comprising a fore-sight which is made of glass or other suitable transparent or translucent, light-transmitting material and is illuminated by a luminous compound or substance preferably of a radio-active character, the same fore-sight being used for firing either by day or by night.

According to the invention the foresight is constituted by a prism having a reflecting surface, beneath which is situated the luminous compound or substance. This prism may be of more or less triangular shape when viewed from the rear, with one corner uppermost to serve as the sighting point or tip.

In order that the said invention may be clearly understood and readily carried into effect, the same will now be described more fully with reference to the accompanying drawings, in which:—

Figures 1 and 2 are respectively a rear elevation and a side elevation of the fore-sight in position on its bracket, and Figs. 3 and 4 are sections of the foresight and its metal support taken respectively on the lines 3, 3 of Figs. 2 and 4, 4 of Fig. 1 and drawn to an enlarged scale.

The glass prism A constituting the fore-sight is arranged, with one corner uppermost, within a dovetail groove in the metal support A′ and is cemented in position. The reflecting surface $a$ of the prism is silvered and bears against a metal protector or stop $a'$ also arranged within the aforesaid dovetail groove and held therein by any suitable means. The luminous compound (which is indicated by $A^2$ in Figs. 3 and 4) is contained in a tray or tube $a^3$ disposed in a groove in the support A′ beneath the prism A; this tray has a flange $A^3$ which is secured to the support A′ by a screw-threaded stud $a^4$ or otherwise and which prevents the prism from becoming displaced from its groove. The support A′ is attached as shown by Figs. 1 and 2 to the bracket $A^x$.

The rear-sight intended to be used with the improved fore-sight may be of the aperture type and suitable means, such as an iris diaphragm or a movable shutter, may be employed for enabling an aperture of increased size to be used for night firing.

What we claim and desire to secure by Letters Patent of the United States is:—

1. In a sighting device for guns, a fore-sight composed of a light-transmitting prism and a luminous compound or substance situated beneath said prism to illuminate it for night use, said prism having a reflecting surface adapted to reflect the rays of the luminous substance rearwardly.

2. In a sighting device for guns, a fore-sight composed of a light-transmitting prism, a luminous compound or substance situated therebeneath, the prism having a reflecting surface adapted to reflect the rays of the luminous substance rearwardly.

3. In a sighting device for guns, a fore-sight composed of a light-transmitting prism of triangular shape when viewed from the rear and having one corner uppermost to serve as a sighting point or tip, a luminous compound or substance situated beneath said prism, said prism having a reflecting surface adapted to reflect light from the luminous substance rearwardly.

4. In a sighting device for guns, the combination of a light-transmitting prism having a reflecting surface, a luminous compound or substance situated beneath said reflecting surface, a receptacle for such luminous compound and a support for said prism and said receptacle, said prism having a reflecting surface adapted to reflect the rays of the luminous substance rearwardly.

5. In a sighting device for guns, the combination of a light-transmitting prism of triangular shape when viewed from the rear, with one corner uppermost, a metal support for said prism said support having a dovetail groove in which the lower part of the prism engages, and a second groove below said dovetail groove, a stop on said support against which said prism bears, a tray disposed in said second groove and carrying a luminous compound or substance, means for attaching said tray to the support and a flange on said tray which, by bearing against the prism, holds the latter in position on the support, the prism having a reflecting surface adapted to reflect the rays of the luminous substance rearwardly.

In witness whereof we hereunto affix our signatures.

ARTHUR TREVOR DAWSON.
GEORGE THOMAS BUCKHAM.